United States Patent
Sendova

[11] Patent Number: 6,132,053
[45] Date of Patent: Oct. 17, 2000

[54] OPTIMIZED HIGHLY EFFICIENT LARGE AREA MODULAR FLAT PANEL DISPLAY LIGHTING DEVICE

[75] Inventor: Mariana Sendova, Sarasota, Fla.

[73] Assignee: Baker Electronics, Inc., Sarasota, Fla.

[21] Appl. No.: 09/097,688

[22] Filed: Jun. 16, 1998

Related U.S. Application Data

[60] Provisional application No. 60/050,010, Jun. 17, 1997.

[51] Int. Cl.[7] ....................................................... F21V 8/00
[52] U.S. Cl. ............................................................. 362/31
[58] Field of Search .......................................... 362/26, 31

[56] References Cited

U.S. PATENT DOCUMENTS

| | | | |
|---|---|---|---|
| 4,811,507 | 3/1989 | Blanchet | 362/31 X |
| 5,070,431 | 12/1991 | Kitazawa et al. | 362/31 |
| 5,079,675 | 1/1992 | Nakayama et al. | 362/31 |
| 5,128,842 | 7/1992 | Kenmochi et al. | 362/31 X |
| 5,339,179 | 8/1994 | Rudisill et al. | 362/31 X |
| 5,390,085 | 2/1995 | Mari-Roca et al. | 362/31 |
| 5,390,276 | 2/1995 | Tai et al. | 385/146 |
| 5,438,484 | 8/1995 | Kanda et al. | 362/31 |
| 5,442,523 | 8/1995 | Kashima et al. | 362/31 |
| 5,461,547 | 10/1995 | Ciupke et al. | 362/31 |
| 5,485,291 | 1/1996 | Qiao et al. | 362/31 X |
| 5,485,354 | 1/1996 | Ciupke et al. | 362/31 |
| 5,584,556 | 12/1996 | Yokoyama et al. | 362/31 |
| 5,664,862 | 9/1997 | Redmond et al. | 362/31 |
| 5,838,403 | 11/1998 | Jannson et al. | 362/26 X |

*Primary Examiner*—Laura K. Tso
*Attorney, Agent, or Firm*—McDermott, Will & Emery

[57] ABSTRACT

A light guide used in flat panel liquid crystal display screens is provided. The light guide has triangular prismatic microgrooves cut within it to define a groove density that varies with distance from a light source. The microgrooves also have a groove angle that is based on two times the critical angle of the light guide, plus or minus approximately two degrees. This configuration of groove density and groove angle provides brighter back lighting compared to conventional flat panel displays with increased uniformity over the majority of the display. The maximized luminance and uniformity allows larger displays to be created out of a single light guide or multiple portions of light guides placed next to each other or in a stacked configuration.

30 Claims, 15 Drawing Sheets

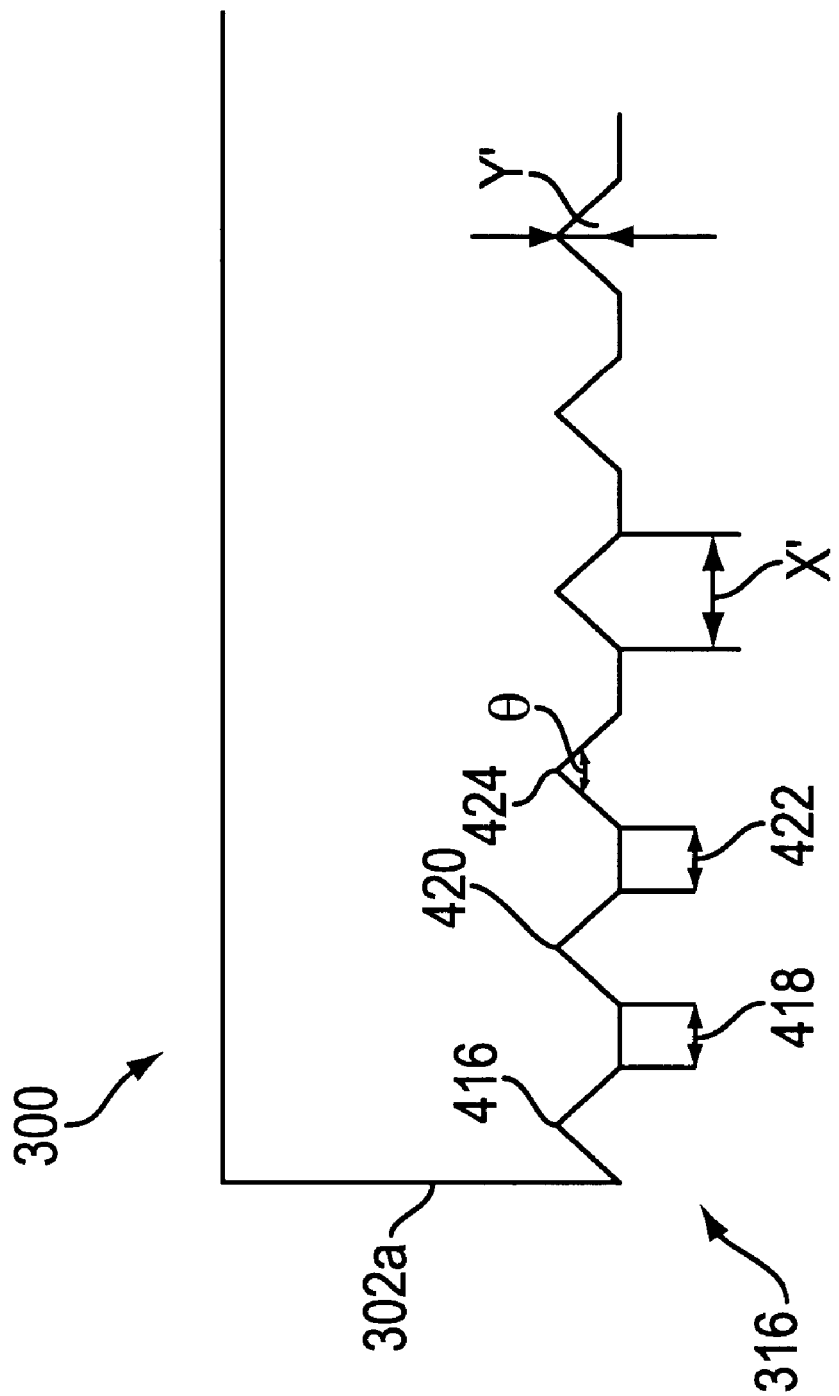

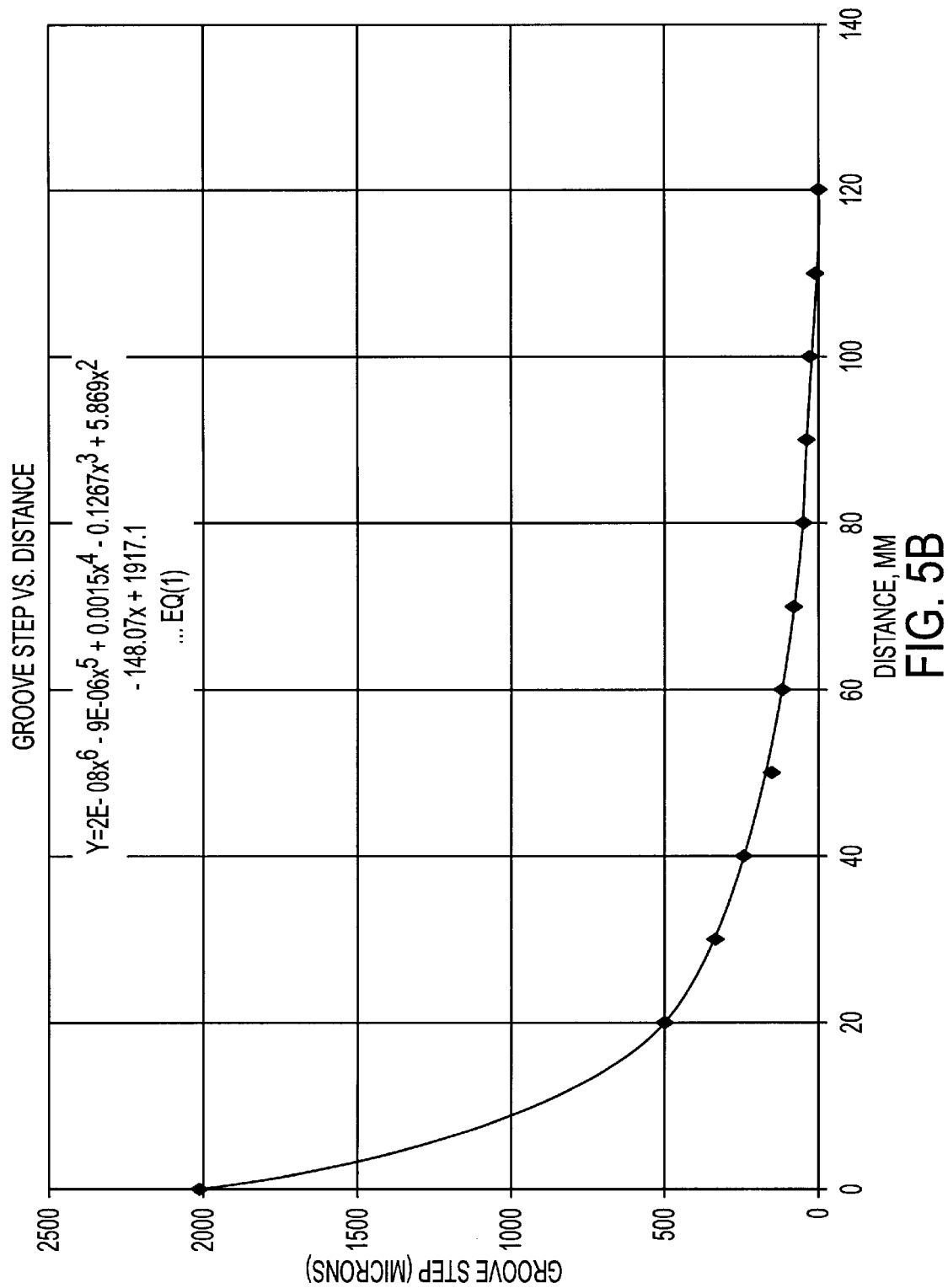

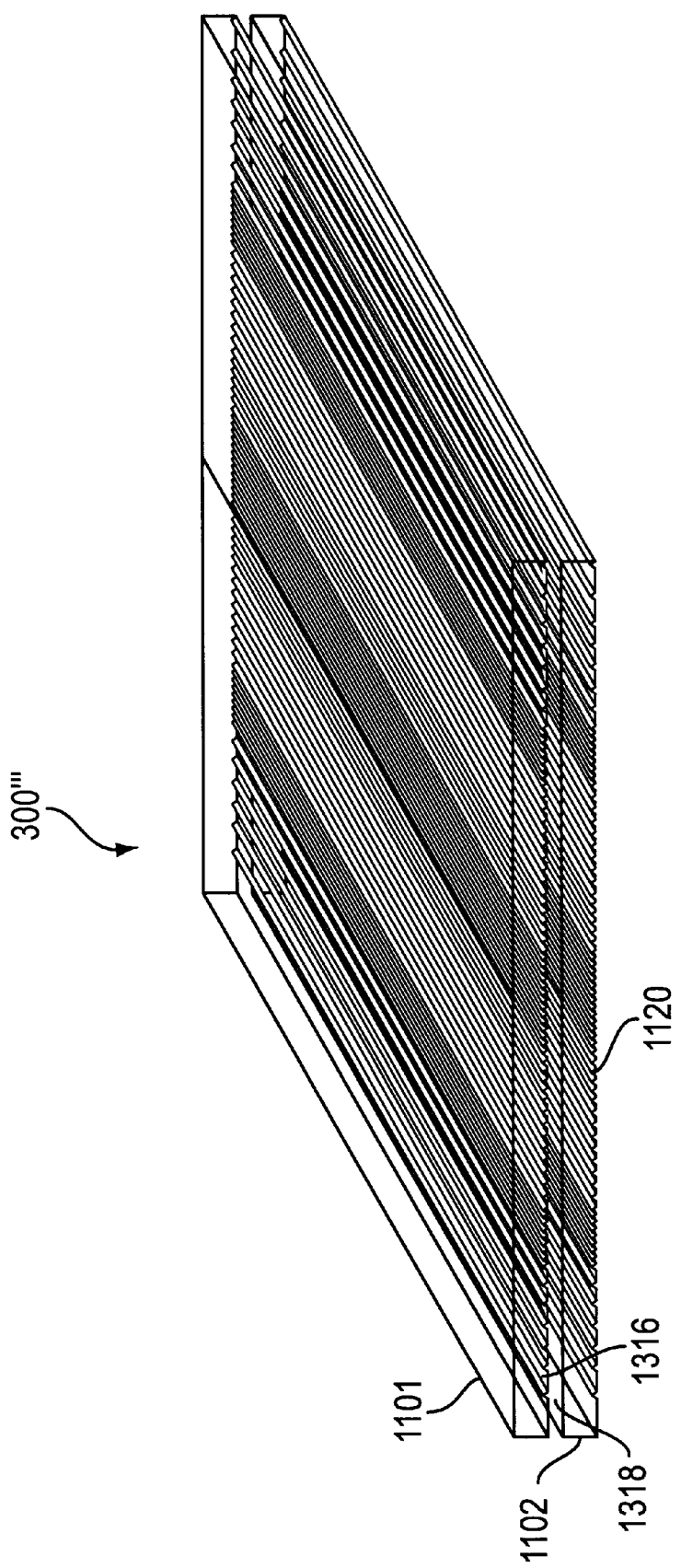

OPTIMIZED HIGHLY EFFICIENT LARGE AREA MODULAR FLAT PANEL DISPLAY LIGHTING DEVICE

CROSS-REFERENCE TO RELATED APPLICATIONS

This application claims priority from provisional patent application Serial No. 60/050,010 filed Jun. 17, 1997, entitled OPTIMIZED HIGHLY EFFICIENT LARGE AREA MODULAR FLAT PANEL DISPLAY LIGHTING DEVICE (attorney docket 43878-016), which is incorporated herein by reference.

BACKGROUND OF THE INVENTION

1. Technical Field

The present invention relates to flat panel display screens, and more particularly to a flat panel display that utilizes a plurality of microgrooves having varying groove density.

2. Description of Related Art

Lighting systems which illuminate liquid crystal displays (LCDs) are well known. Typically, these lighting systems are used in portable electronics, such as lap-top computer displays, where bright illumination provided by low-power is preferred.

Conventional LCDs often employ planar light guides having edge-lit end surfaces and have an etched diffusion back surface to reflect light towards the front viewing surface. Some less conventional LCDs employ light guides having edge-lit end surfaces and prismatic microgrooves which are parallel to each other and the edge-lit surfaces. The microgroove-type LCDs use the combination of edge-lighting and microgrooves to reflect light, which would have been totally internally reflected, towards the front viewing surface. However the microgroove arrangement is far less common than the etched diffusion arrangement due to the ease of fabrication of the etched surfaces as compared to the microgrooved surfaces, and the lack of uniformity of illumination caused by the microgrooves.

The microgroove back lighting arrangements that exist typically employ a linear light source, such as a cold cathode fluorescent lamp (CCFI), at one or two edges of light transmissive material. The microgrooves are cut in the back surface to allow light entering the light transmissive material at angles greater than the critical angle necessary for total internal reflection to be reflected out the front surface toward the LCD. In this way, light which would normally be totally internally reflected by the otherwise nongrooved back surface is reflected toward the front surface providing a brighter display.

FIG. 1 shows a microgroove arrangement where light guide 11 is used for back lighting a liquid crystal display (LCD) 12. The light guide includes a front planar surface 13 and an opposite back light extracting and reflecting surface 14 created by facets 16 formed by V-shaped microgrooves (grooves) 17. Grooves 17 extend across surface 14, and facets 16 of grooves 17 make groove angles 19 which typically range between 45 and 90 degrees. Microgroove depths often range between 2.5–10 micrometers and the width of light guide 11 is approximately 1 millimeter. In conventional back lighting displays, groove step 18 remains constant along the length of surface 14.

A light input surface 20a is located adjacent a standard light source 21. Light source 21 includes a cylindrical envelope 22 which houses a coaxial filament 23. Filament 23 radiates light in all directions as indicated by arrows 24. A U-shaped reflector 26 encloses the lamp and reflects the energy into light guide 11 in a plurality of directions. Reflector 26 may comprise a thin sheet of reflective material. A reflector 28 has a reflecting surface 29 which is place adjacent the faceted surface 14, and reflects the light from surface 14 back into light guide 11 where it emerges to back light the LCD display 12.

A light input surface 20b is depicted as being adjacent to a reflector 38 which reflects any light traveling through the light guide 11 back into the light guide 11 to further increase the efficiency of conversion of light from incandescent source 21 for back lighting the LCD. Alternatively, reflector 38 can be replaced with a second light source (not shown).

U.S. Pat. No. 5,485,354 to Ciupke et al., U.S. Pat. No. 5,442,523 to Kasima et al., and U.S. Pat. No. 5,390,276 to Tai et al. each disclose flat panel displays that employ microgrooves and edge-lighting to provide a back lit display similar to that discussed above. The microgrooves have very broad angular ranges and use the range of angles to reflect light input from the edge towards the front surface and LCD. However, all of these conventional back lighting devices depict microgrooves having a fixed groove density and specify no relationship between the groove density and lighting uniformity viewed from the front surface. Furthermore, no relationship is specified between groove density and the distance from the edge of the light guide where light is introduced. There is also no relationship specified between groove angle and the critical angle of the light guide at which total internal reflection occurs.

The groove density and groove angle parameters have been found to be very important to the efficiency and the luminous uniformity of the back light design. Efficiency can be defined as the ratio between the luminous flux entering the light guide through the input edges and the luminous flux emanating from the flat panel display. Luminous uniformity measures intensity of light emitted from the front surface compared to other locations on the front surface. However, none of the existing technology provides high efficiency and uniformity by defining the relationship between groove density and distance from the edge of the light guide for groove angles related to the critical angle of the light guide.

FIG. 2 is a graphical representation depicting luminance distribution across the front surface of a light guide which can be used to evaluate performance of the light guide. FIG. 2 has an X-axis showing distance in millimeters from input surface (at 0 mm) to a second input surface (at 160 mm). A Y-axis shows luminance measured in candellas/meters$^2$ times steradian (Cd/m$^2$ sr) which is analogous to the conventional measure of luminance.

A plot 200 is generally shown by small squares and illustrates the illumination emanating from a conventional back lighting device such as that described above in conjunction with FIG. 1. It should be noted that a localized peak luminance 202 is shown for plot 200 at approximately ten millimeters from input surface (0 mm), and another localized peak 204 occurs at approximately 155 millimeters from input surface (0 mm). Localized peak 204 results from a second light source (not shown) being placed at the input surface located at 160 mm. Thus, peak 204 is approximately 5 mm from input surface at 160 mm.

Plot 200 illustrates that with two input light sources 21 in a conventional configuration, the luminance emitted from surface 13 (FIG. 1) falls into a luminance valley 206 at approximately midway along the 160 millimeter length. Thus, although those viewing a typical back lighting device are likely to view the center area near by valley 206, these viewers see the least amount of luminance as compared to areas closer to peaks 202 and 204 which are near light sources 21 than valley 206. This results largely from the midpoint (80 mm) of surface 13 being equally far from each light source 21. The occurrence of valley 206 defines limits to the size of flat panel display screens since luminance values falling below certain acceptable standards for illumination occur at points near the midpoint of the screen. Some conventional systems satisfy the standards by introducing more power which raises the luminance of valley 206 to acceptable levels. However, practical limits to the amount of power that portable devices could provide has limited the size of portable flat panel display screens.

Accordingly, a need exists to increase luminance around the center area of a flat panel display.

Another need exists for maximizing luminance at a midpoint between light sources thus providing better illumination than conventional systems for areas of significant viewing attention.

Another need exists for an arrangement that provides increased uniformity of illumination at each point along the viewing surface of the back light display.

Yet another need exists for providing a light guide which is suitable for back lighting large panel displays with diagonal measurements larger than 345 millimeters or 13.8 inches.

There is also a need for an arrangement which optimizes the groove angle and groove density of a back lighting display to increase luminance viewed from the front surface.

SUMMARY OF THE INVENTION

These and other needs are attained by the present invention, where a light guide includes a light transmissive material comprising a light input surface and a back surface, wherein the back surface includes a plurality of microgrooves positioned substantially parallel to one another and the microgrooves define a groove density that varies according to distance from said light input surface.

According to one aspect of the present invention, the light guide has a critical angle at which total internal reflection occurs and the groove angle of the microgrooves is approximately twice said critical angle within approximately two degrees.

Another aspect of the present invention provides a flat panel display screen comprising: a side light source; a light guide having a front surface, a side surface in optical communication with said side light source such that light is transmitted from said side light source through said light guide, and a back surface that includes microgrooves which reflect light input through said side surface to said front surface, said microgrooves being disposed according to a varying groove density, and said microgrooves having a groove angle that is based on twice a critical angle of said light guide and an angle margin, and a housing securing the side light source and the light guide in a working relationship to one another.

A further aspect of the present invention includes a method of creating a light guide having a plurality of triangular prismatic microgrooves with a varying groove density, comprising: calculating a critical angle for total internal reflection for a light transmissive material from which the light guide is made; calculating a groove angle based on the critical angle: calculating the groove density based on a distance from a light input edge where light is input for transmission through said light guide and output; and forming said light guide in accordance with the groove angle and groove density.

A still further aspect includes a method of creating a light guide having a plurality of triangular prismatic microgrooves, comprising: identifying a transmission ratio measured between said input surface and said front surface to determine a critical angle at which total internal reflection occurs within said light guide; identifying an angle of said microgrooves based on said critical angle, determining a distance from a light input source adjacent to said light guide; calculating groove density as a function of distance from said light input surface,; and cutting microgrooves in said light guide based on said calculated groove density.

An advantage of the present invention is that luminance around the center area of a flat panel display is increased as compared to conventional flat panel displays.

Advantageously uniformity of illumination at each point along the viewing surface of the back light display is increased as compared to conventional flat panel displays.

The increase of uniformity and luminance over the screen allows for suitable back lighting of large panel displays with diagonal measurements larger than 345 millimeters or 13.8 inches.

Advantageously, maximizing groove density and groove angle can be done in modular sections to further allow the creation of large displays, and brighter displays by stacking modular sections in the direction normal (perpendicular) to the flat panel surface.

Additional objects, advantages and novel features of the invention will be set forth in, or apparent from the following detailed description of the preferred embodiments of the invention.

BRIEF DESCRIPTION OF THE DRAWINGS

Reference is made to the attached drawings wherein elements having the same reference numeral designations represent like elements throughout and wherein:

FIG. 4 is a partial side cross-sectional view of an embodiment of the present invention having varying groove density;

FIG. 5B is a graphical representation of groove step relative to distance from a reference light input surface in an embodiment of the present invention;

FIG. 11 is a transparent perspective view of an embodiment of the present invention depicting a pair of light guides stacked upon each other where each has varying groove density.

DETAILED DESCRIPTION OF THE INVENTION

Figure 2:
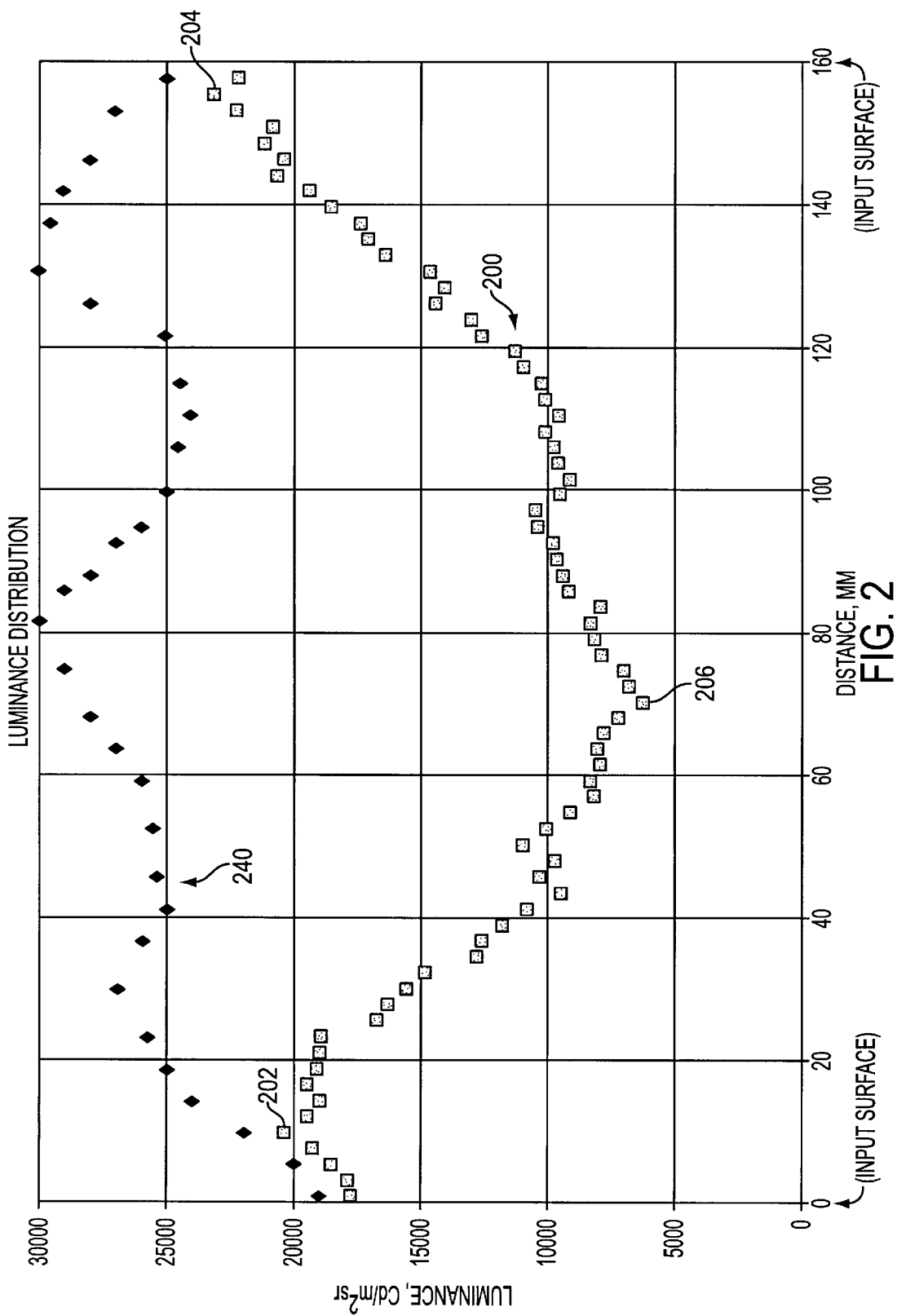
FIG. 2 is graphical representation depicting luminance distribution of a conventional flat panel display and luminance distribution of a flat panel display implementing aspects of the present invention.
Figure 3:
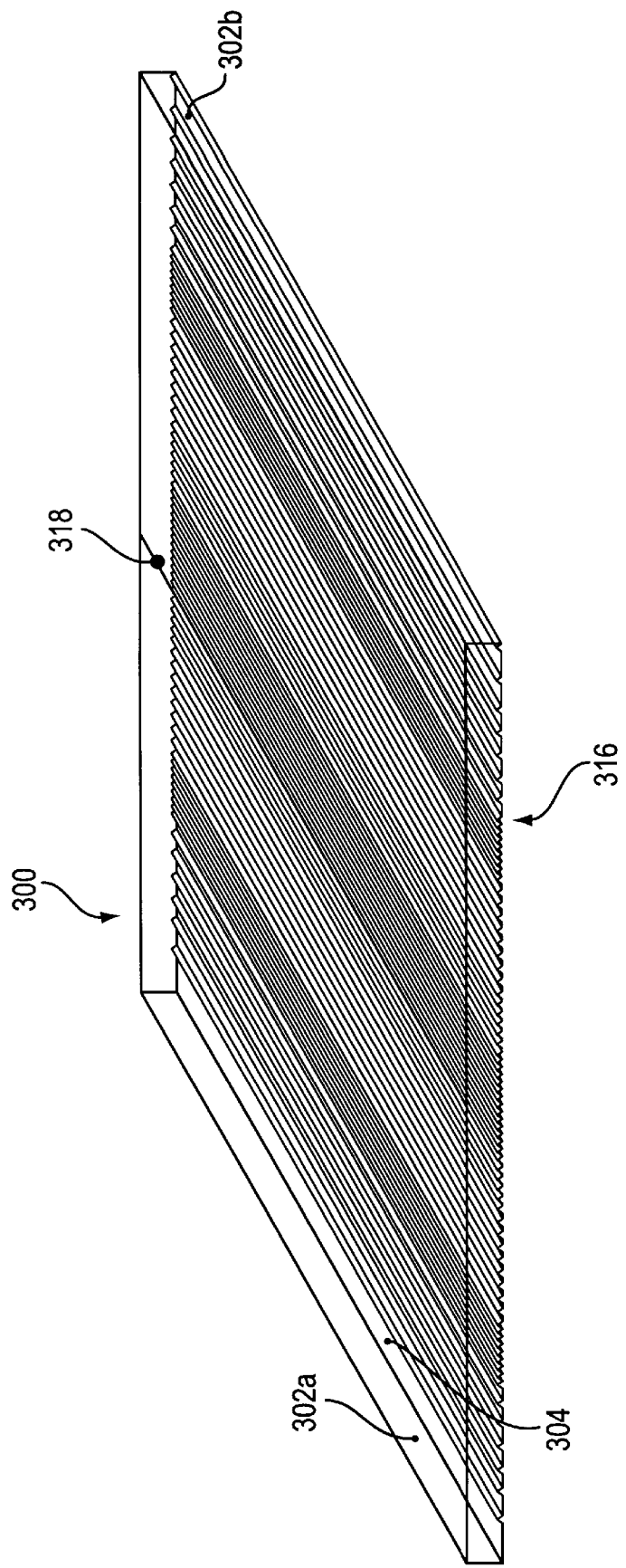
FIG. 3 is a transparent perspective view of an embodiment of the present invention having varying groove density.

In additional to showing the luminance of a conventional flat panel display, FIG. 2 also shows a plot 240 which illustrates the luminance measured from the front viewing plane of an embodiment of the present invention, such as that depicted in FIG. 3. Plot 240 has increased luminance levels over the majority of the distance along the front surface, and increased uniformity as compared to plot 200. Plot 240 was generated from experimental data analyzing an embodiment of the present invention such as that disclosed in FIG. 3.

FIG. 3 shows a transparent perspective view of the embodiment of the present invention which utilizes a varying groove density to increase luminance output at a front surface as compared to conventional systems. FIG. 3 shows light guide 300 as comprising a pair of input surfaces 302*a* and 302*b*, although only a single light input surface need be utilized to realize the benefits of the present invention which result from the varying groove density on back surface 304.

Specifically, back surface 304 has a plurality of microgrooves 316 that reflect light input through light input surfaces 302*a* and 302*b* to front surface 318. Light guide 300 is shown without conventional light sources such as light sources 21 shown in FIG. 1, so as not to detract from the focus from the present disclosure. However, conventional light input sources 21 are to be positioned adjacent to or in contact with either of light input surface 302*a* or 302*b*.

Light is transmitted through light guide 300 in a manner similar to that described above in conjunction with FIG. 1. However grooves 316 are configured in such a way as to produce the results of plot 240 which have a higher luminance output as compared to that of plot 200. In particular, the center region between 10 millimeters and 150 millimeters from the light input surface (at 0 mm) shows the majority of points on plot 240 falling between 30,000 and 22,000 (cd/m² sr) whereas the center region of plot 200 near valley 206 shows luminance values at around 6,000 (cd/m² sr). furthermore, plot 240 shows much more luminance uniformity over the entire plot due in part to the varying groove density of the present invention, when compared to plot 200. The uniformity of plot 240 is characterized by less fluctuation of luminance levels over the entire surface of the light guide.

FIG. 4 illustrates a partial cross sectional view of an embodiment of the present invention where light guide 300 has a left-most groove 416 which is adjacent to light input surface 302*a*. The angle of groove 424 and of grooves 316 is depicted as θ. Groove angle 424 is calculated using a transmission ratio of the light guide to determine the critical angle at which light is totally internally reflected, and then multiplying the critical angle by two. Adjusting the groove angle by plus or minus two degrees intentionally or accidentally is acceptable, and actually advantageous in the case of adding two degrees to twice the critical angle of acrylic.

A groove step 418 is measured between groove 416 and groove 420. Similarly, another groove step 422 is the distance between groove 420 and groove 424. Although groove angle θ and groove width x' and groove height y' remain constant for each groove, the groove steps 418, 422, etc. vary relative to each other. Specifically, groove step 418, 422 increases in length with distance from a light input source 21 which is typically adjacent to light input edge 302*a*. If two light sources are used, groove step 418. 422 increases with increasing distance to the closest light source to define an axis of symmetry of groove density between the light sources.

Figure 5A:
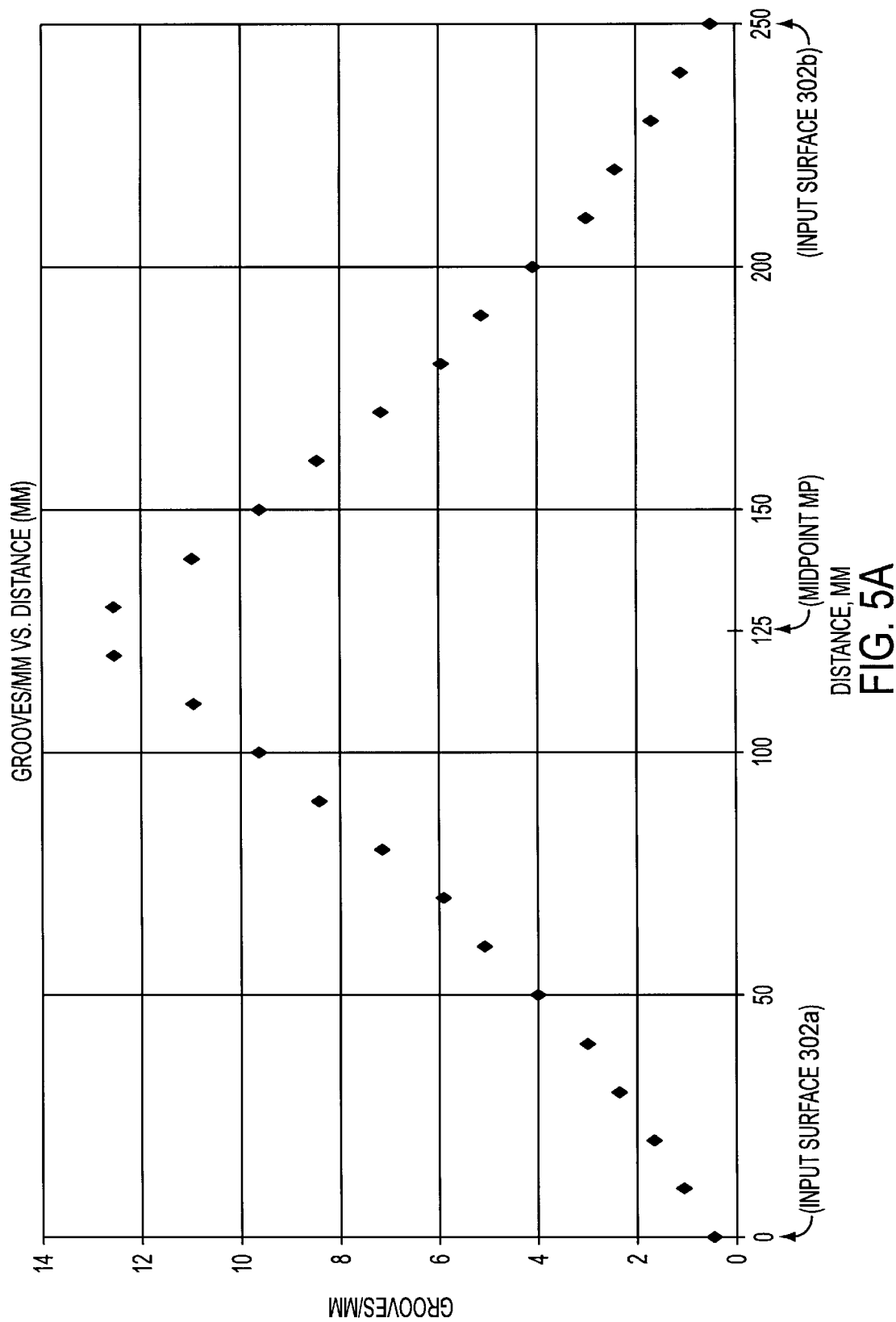
FIG. 5A is a graphical representation of groove density relative to distance from a reference light input surface in an embodiment of the present invention.

FIG. 5A illustrates a graphical representation of groove density measured in millimeters versus distance from light input edge 302*a* at 0 millimeters to light input edge 302*b* at 250 millimeters. The graph depicted in FIG. 5A shows that groove density increases from light input edge 302*a* to midpoint at 125 millimeters and then decreases from midpoint at 125 millimeters to light input edge 302*b* at 250 millimeters using two light sources. Thus groove density is at a minimum adjacent the light input surface 302*a* and increases with increasing distance from light input surface. Between 125 millimeters (midpoint of 250 millimeter surface) and input surface 302*b*, groove density decreases steadily as a result of the second light source (not shown) being positioned adjacent to light input surface 302*b*. If a second light input source were not put at light input surface 302*b*, the graph of FIG. 5A would indicate groove density steadily increasing with increasing distance from the single light input surface 302*a*.

FIG. 5B illustrates a graphical representation of the steady decrease of groove step 418, 422 which increases groove density from light input surface 302*a* to a point at 120 millimeters from input surface 302*a*. FIG. 5B provides a different perspective on groove density by depicting groove step measured in microns on the y-axis. Groove step is the measurement between grooves as illustrated in FIG. 4 with representative groove steps 418 and 422. FIG. 5B illustrates that the groove step closest to light input surface 302*a* approaches 2,000 microns and decreases sharply to approximately 500 microns at 20 millimeters from input surface 302*a* following the equation depicted on FIG. 5B:

$$y = 2E\text{-}08x^6 - 9E\text{-}06x^5 + 0.0015x^4 - 0.1267x^3 + 5.869x^2 - 148.07x + 1917.1 \quad \text{EQ(1)}$$

In EQ(1), y is the groove step distance x is the distance from a reference light input edge such as 302*a*, and E is a luminance constant measured in Lux based on the specific measurable parameters of the light guide. EQ(1) can be calculated using a conventional optics software program by specifying the thickness of the light guide, the desired global uniformity (e.g., 85% which is within tolerable limits), the groove angle, and the number of point light sources simulating the infinite light source of a CCFL.

Figure 6:
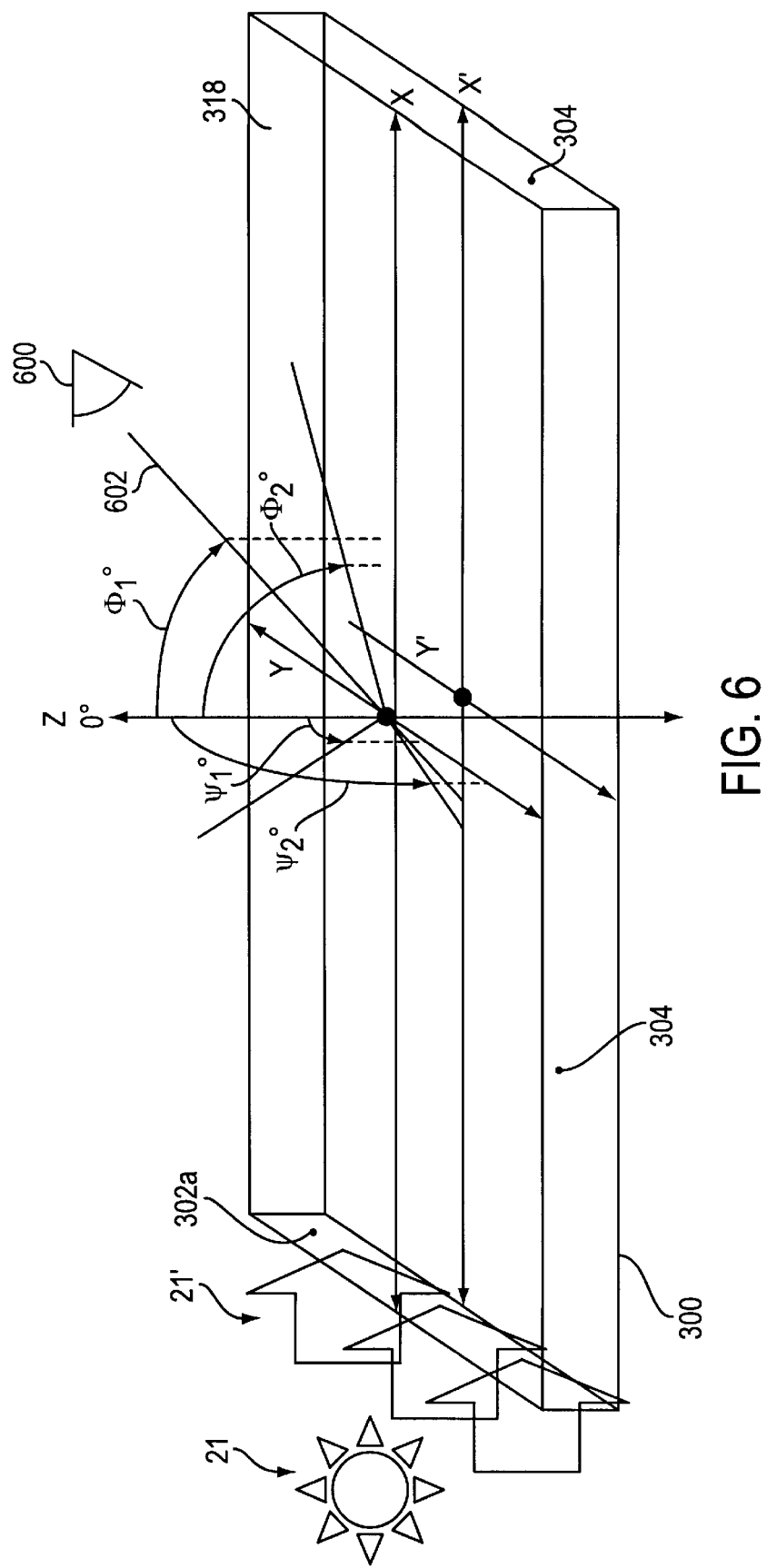
FIG. 6 is a transparent perspective view illustrating the path of light rays emanating from an embodiment of the present invention.

FIG. 6 illustrates a perspective view of light guide 300 in which a single light source 21 is conceptually shown as a light 21 inputting light 21' into surface 302*a*. In the embodiment of FIG. 6, a viewer 600 views a light ray 602 emanating from surface 318 at angle $\Phi_1$ degrees from normal z-axis. Front surface 318 is located in the x-y plane and the z-axis is normal (0°) to the x-y plane.

Microgrooves (not shown) are cut along the back surface 304 which is in the x'-y' plane, in a direction parallel to the y' axis. Thus, microgrooves (not shown) are perpendicular to the direction of incoming light 21', Light 21' is reflected off the microgrooves in the x'- y' plane through front surface 318 (and an LCD which is not shown) to viewer 600. Of course, viewer 600 could be at any angle such as angle $\Phi_2$ in the x-z plane, or angles $\Psi_1$, $\Psi_2$ in the y-z plane, or any angle above the x-y plane in positive z space to receive light emitted front view plane 318.

Figure 7A:
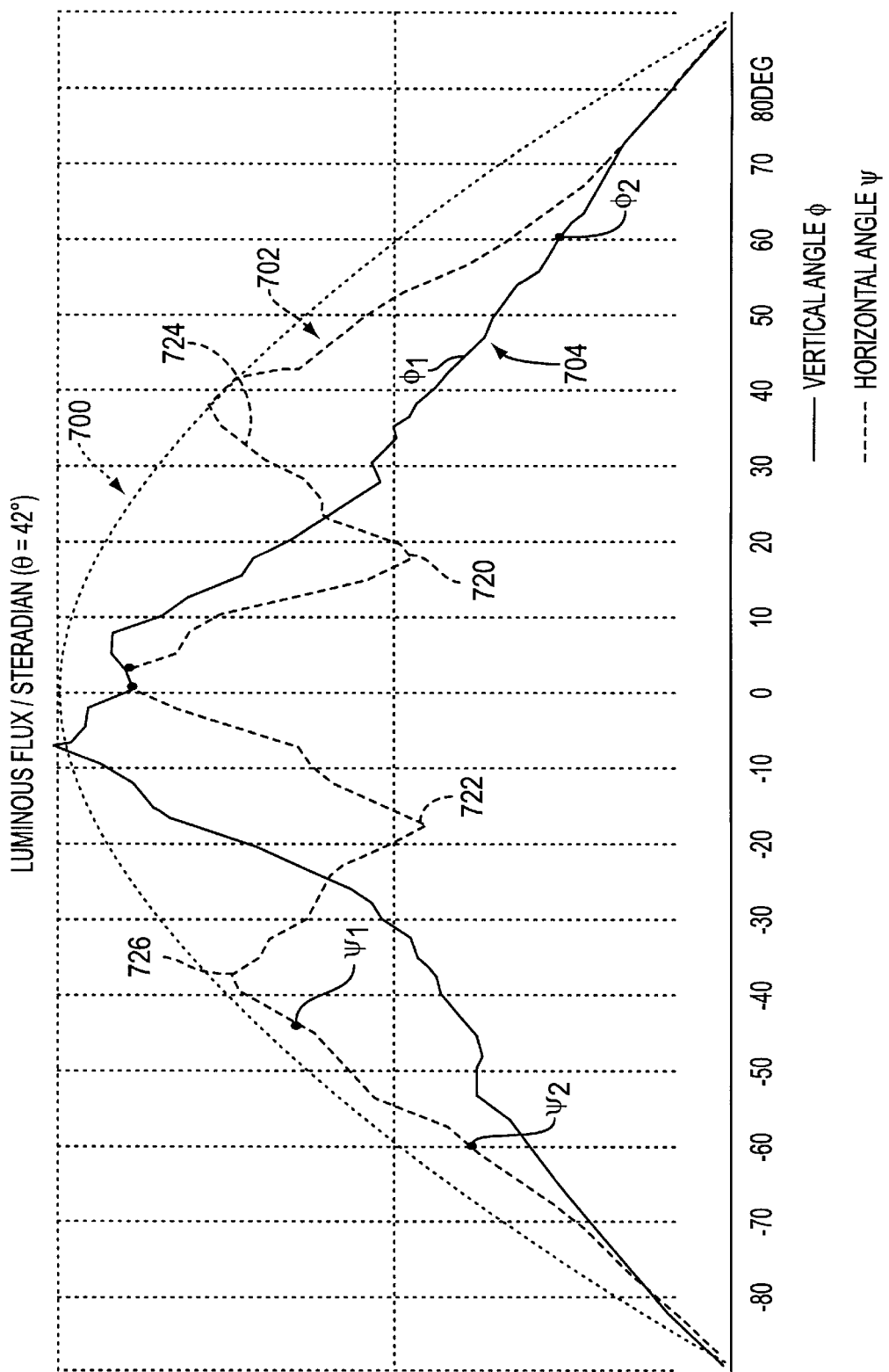
FIGS. 7A–D are graphical representations of the angular distribution of luminosity of light emitted from the front surface of an embodiment of the present invention.

FIGS. 7A–7D graphically depict a plot 700 which shows an ideal illumination from front surface 318 of light guide 300 at varying angular distributions (measured from the normal to surface 318) shown on the x-axis. In other words, the x-axis of FIG. 7A depicts varying angles measure from the z axis (0 degrees) of FIG. 6. Plot 702 illustrates the horizontal angle Ψ (measured from normal) and plot 704 illustrates the vertical angle Φ measured from normal. The positive degree angles indicate horizontal angles Ψ measured in the positive x-z plane in FIG. 6 and positive degree vertical angles indicate angles in the positive y-z plane of FIG. 6. the differences between FIGS. 7A through 7D arise from varying the groove angle θ for microgrooves cut into an acrylic light guide.

FIG. 7A illustrates angular distribution of luminance intensity measured in luminance flux/steradian on the front surface 318 of light guide 300 is for groove angle θ equals 42 degrees. At equal angles of Φ and Ψ (equal to 0 degrees on the x-axis of FIG. 7A). viewer 600 is normal to front surface 318 and looking directly down the z axis of FIG. 6. The vertical angle $\Phi_1$ is approximately at 45 degrees on the x axis of FIG. 7A and the vertical angle $\Phi_2$ is at approximately 60 degrees, both angles $\Phi_{1,2}$ corresponding to that shown on FIG. 6. As shown in FIG. 7A, the luminance intensity at $\Phi_1$ is greater than that at $\Phi_2$. Similarly, horizontal angles at $\Psi_1$ and $\Psi_2$ correspond to that shown in FIG. 6 and indicate that at $\Psi_1$ has greater luminance intensity than at $\Psi_2$ which indicates that as the perspective of viewer 600 along the y-z plane travels from $\Psi_1$ to $\Psi_2$, luminance intensity decreases.

FIG. 7A illustrates that for groove angles of θ=42 degrees, luminance intensity in the horizontal direction drops significantly at around positive and negative 18 degrees from normal indicated by local minimum points 720 and 722. Local minimum points 720 and 722 illustrate a lack of uniformity in illumination in the horizontal direction passing from 0 degrees to plus or minus 90 degrees particularly when compared to points 724 and 726 at approximately plus or minus 40 degrees which have much higher luminance intensity as compared to local minimums 720 and 722.

Figure 7B:
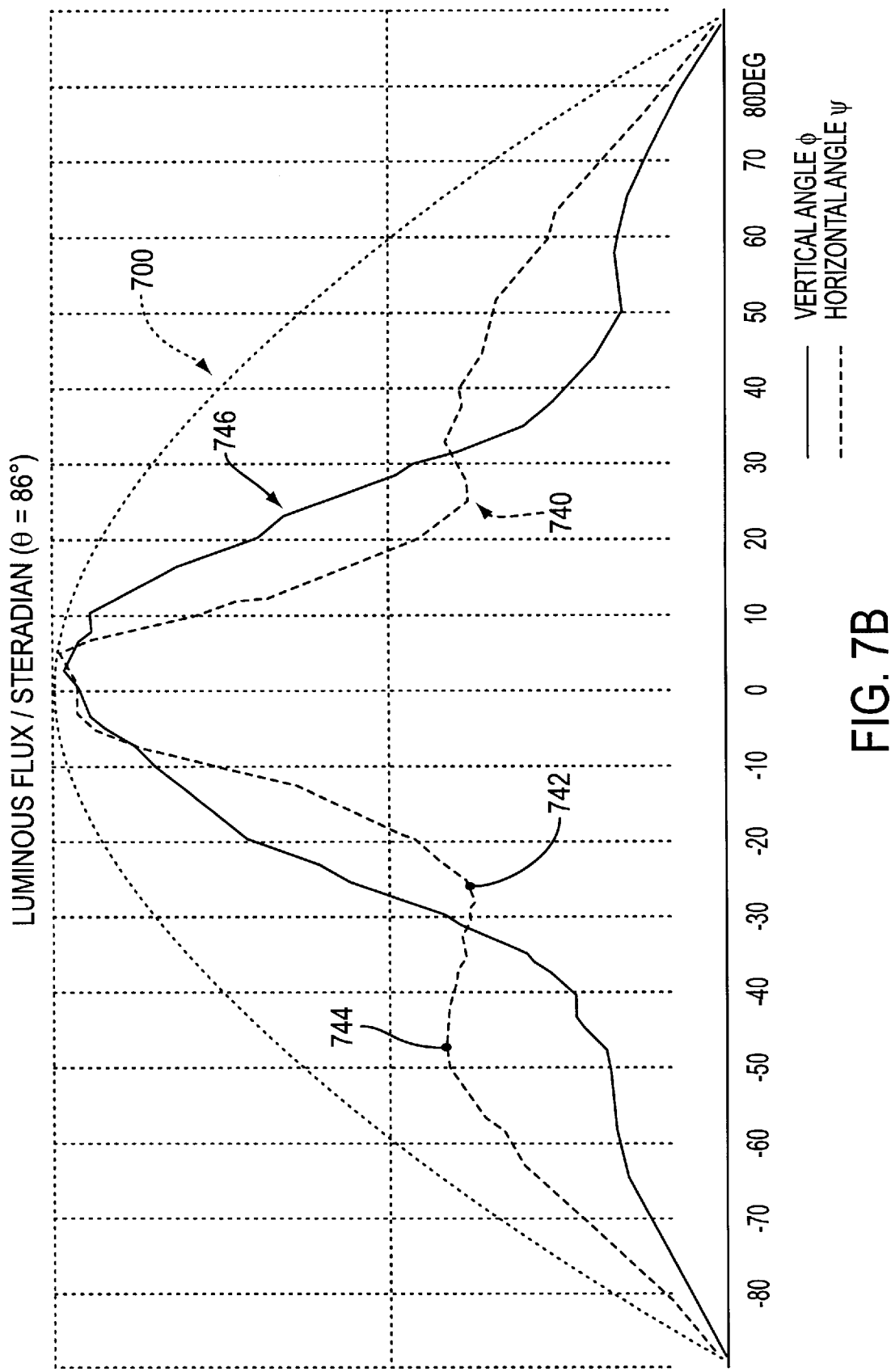
Figure 7C:
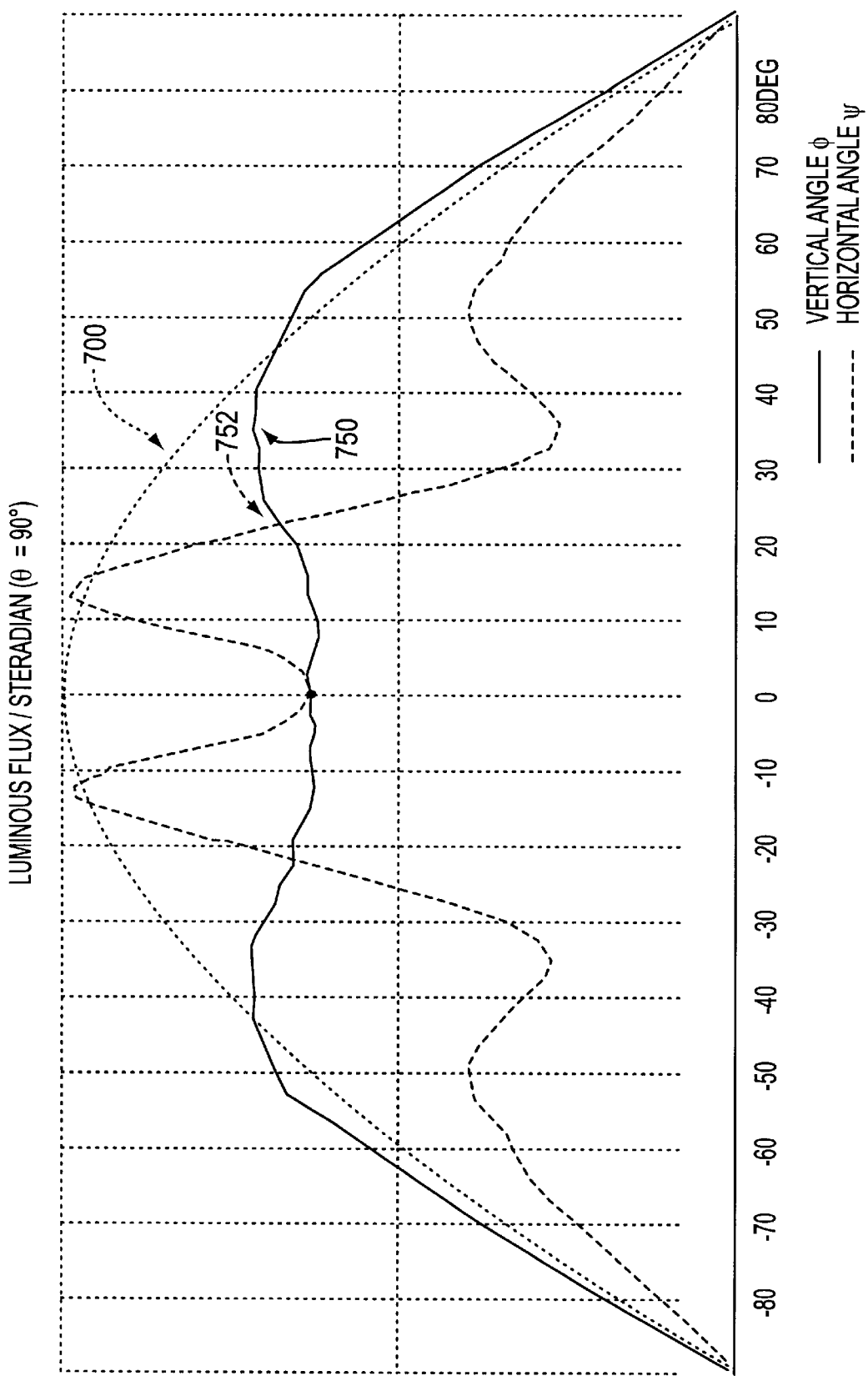
Figure 7D:
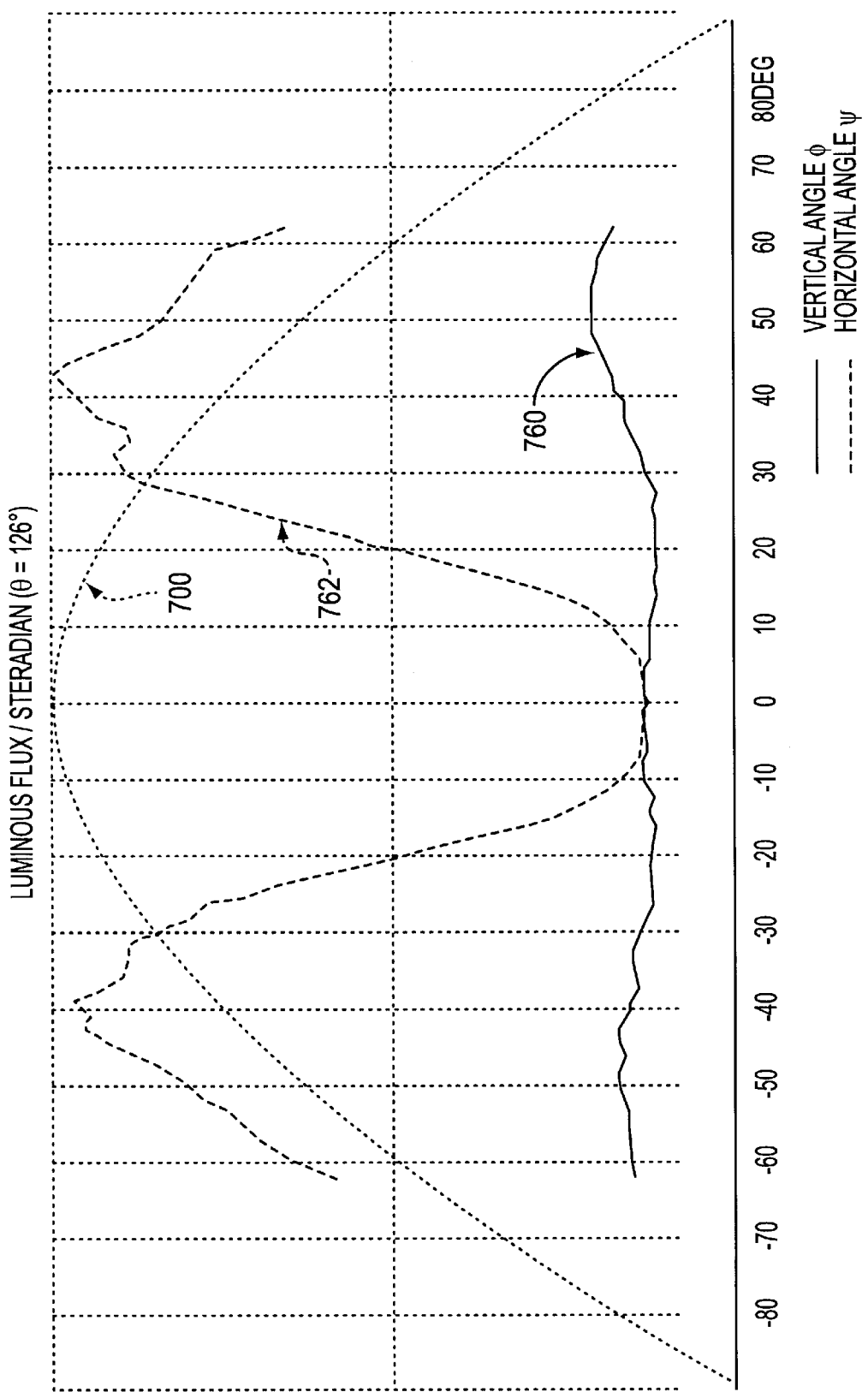

FIG. 7B shows enhanced performance of an acrylic light guide compared to FIGS. 7A, 7C and 7D. In FIG. 711, the groove angle θ is taken to be approximately 2 times the critical angle for total internal reflection within acrylic (i.e., 42 degrees) or equivalent plus or minus 2 degrees. The groove angle θ for grooves 316 in FIG. 7B equals 86 degrees which is plus 2 degrees of double the 42 degree critical angle of acrylic. A horizontal plot 740 is much smoother than corresponding plot 702 of FIG. 7A since local minimum point 742 does not have much less luminance intensity than local maximum point 744. Additionally, a vertical distribution plot 746 is shown to maintain a high luminance intensity input between positive and negative 40 degrees, as does plot 740.

FIGS. 7C and 7D correspond to the luminance intensity versus angular distribution for groove angles of 90 degrees and 126 degrees, respectively. Compared to FIG. 7B, FIGS. 7C and 7D show a very low luminance output for vertical distribution plots 750 and 760 respectively. The luminance intensity for plots 750 and 760 is much less than ideal plot 700 at 0 degrees in FIGS. 7C and D. Furthermore, FIGS. 7C and 7D show more erratic behavior for horizontal angular distribution plots 752 and 762, respectively which show large swings in luminance intensity when passing between 0 degrees and plus or minus 90 degrees. Large swings in luminance intensity indicate poor uniformity.

Therefore, FIGS. 7A through 7D show that performance of luminous intensity output is optimized where groove angle θ is approximately twice the critical angle at which total internal reflection occurs (i.e., 42 degrees for acrylic) plus or minus 2 degrees. As shown in FIG. 7B for angular distributions close to 0 degrees, luminous intensity remains much more consistent than that depicted within the same angular distribution of FIGS. 7A. 7C and 7D.

Figure 8:
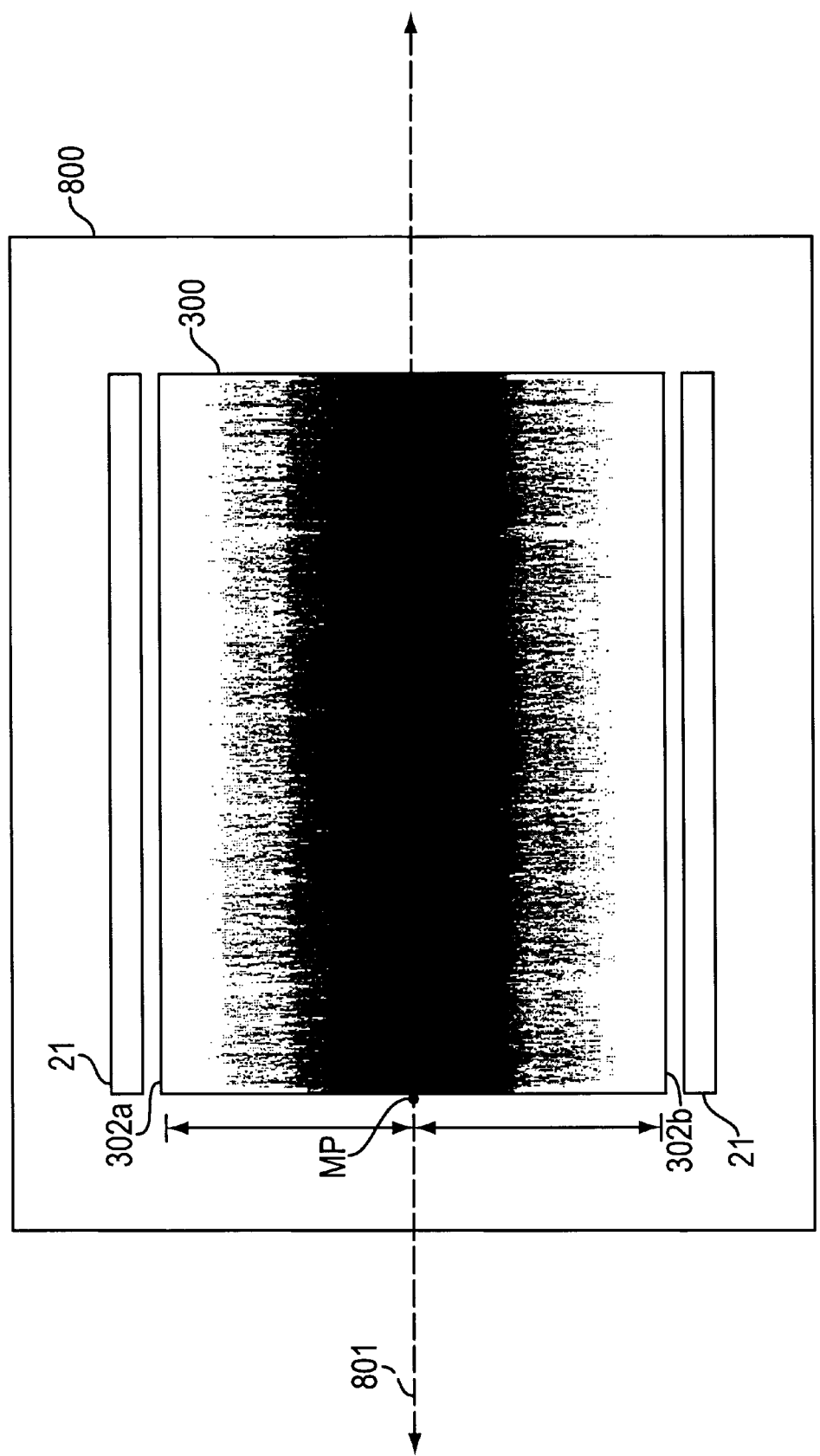
FIG. 8 is a front view of a flat panel display screen implementing a light guide embodiment of the present invention.

FIG. 8 illustrates another embodiment of the present invention in which a light guide 300, similar to that discussed in the embodiment of FIG. 7B is secured within a housing 800 such that a pair of light input sources 21 are secured adjacent light input edges 302a and 302b. Since two light input sources 21 are used instead of only one, groove density increases from light input source 302a to midpoint (MP) which is on an axis of symmetry 802 between input surfaces 302a and 302b. Groove angle density also increases steadily between light input surface 302b and axis of symmetry 802. It should be noted that the shaded region within light guide 300 is darkest on either side of axis of symmetry 802 and lightest adjacent light input sources 302a and 302b to indicate groove density is at a maximum closest to the axis of symmetry 802 and at a minimum closest to light input sources 21, respectively.

Figure 9:
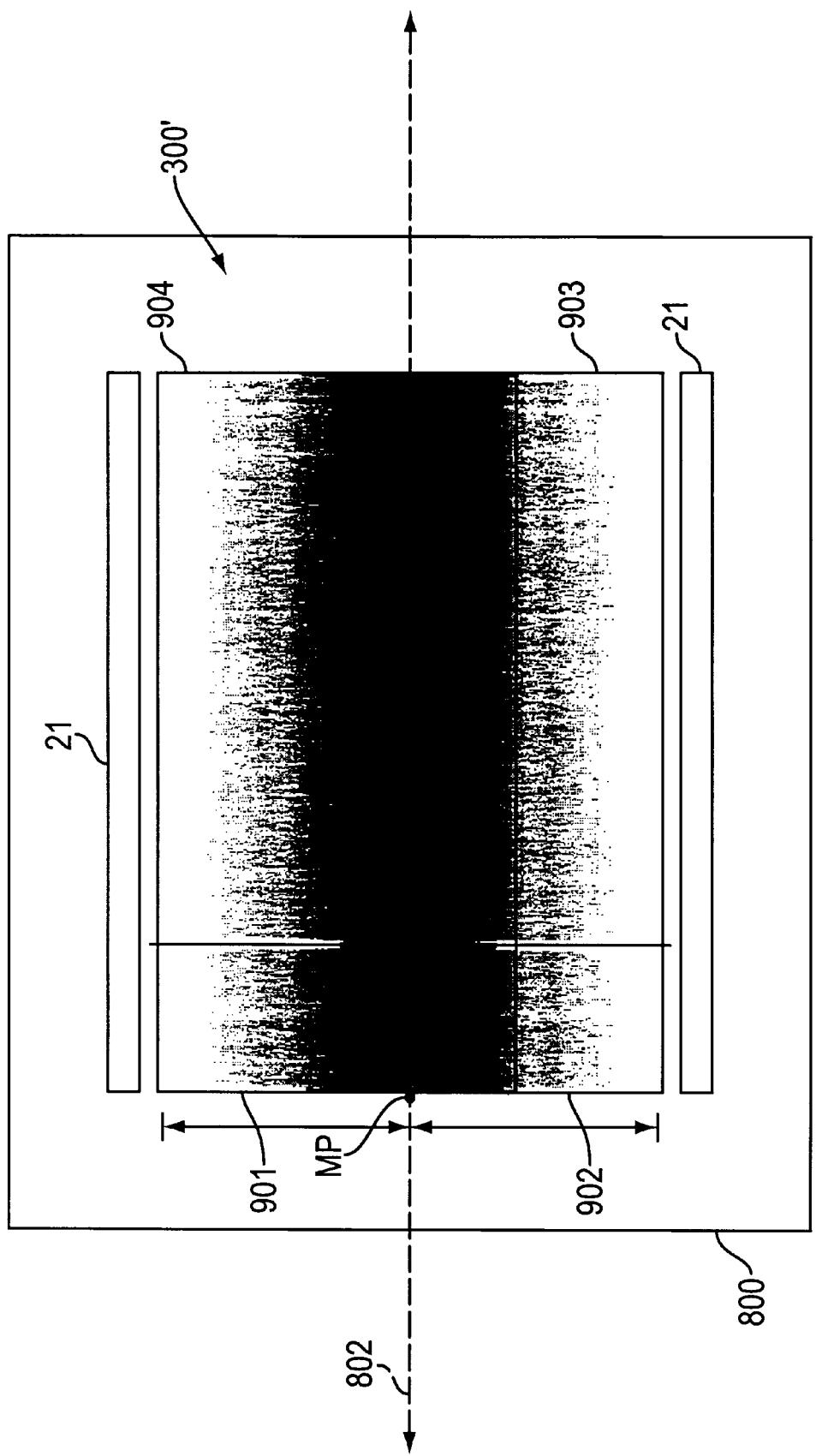
FIG. 9 is a front view of flat panel display screen implementing a plurality of light guide embodiments of the present invention.

FIG. 9 discloses a similar embodiment to that disclosed in FIG. 8, but with a plurality of light guides 901, 902, 903 and 904 which together make up light guide 300', Housing 800 secures light guide 901, 902, 903 and 904 adjacent to one another such that the varying groove density of each light guide increases with increasing distance from the closest light source 21. Thus, light guide 300' can be made modular by utilizing a plurality of portions, in this case light guides 901 through 904, when the overall configuration is characteristic of having groove density increases with increasing distance from each light source 21. If two light sources 21 are present such as that disclosed in FIG. 9. groove density is maximum adjacent an axis of symmetry 802 located at midpoint MP between light input sources 21.

Figure 10:
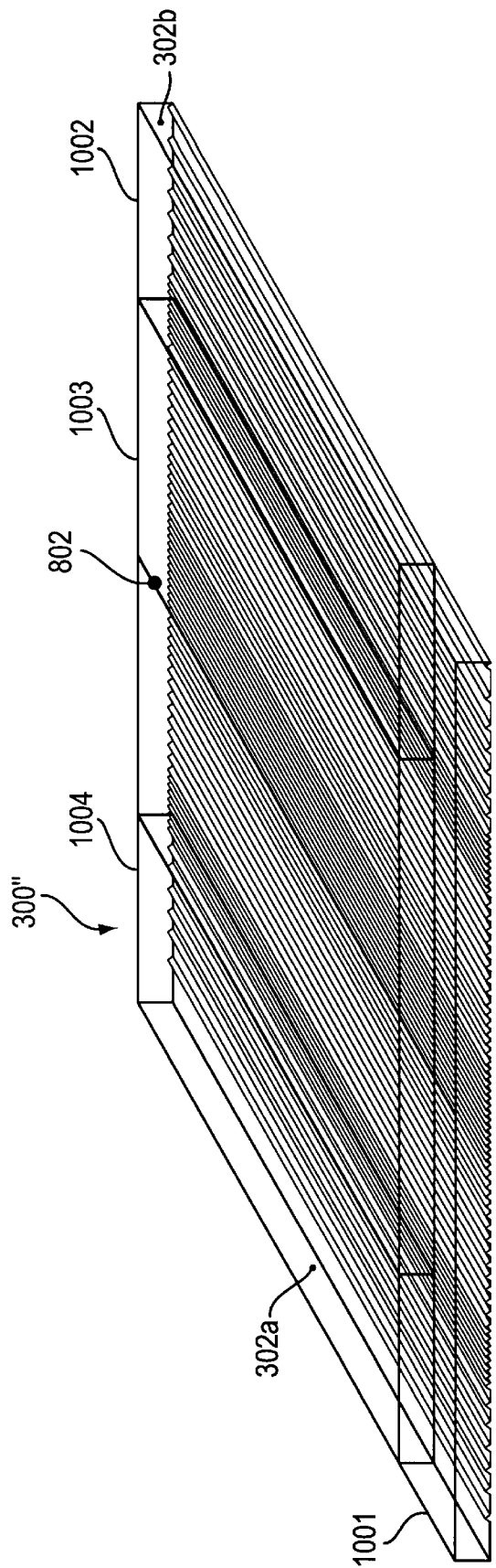
FIG. 10 is a transparent perspective view of an embodiment of the present invention depicting a plurality of light guides each having varying groove density.

FIG. 10 illustrates a transparent perspective view of a light guide 300" comprises of a plurality of portions 1001, 1002, 1003 and 1004. Each light guide 1001 through 1004 comprises a portion of the greater light guide 300" such that the light guide 300" has the appropriate overall varying groove density. Each individual light guide portion 1001 through 1004 has increasing groove density based on increasing distance from light input surface 302a or 302b which will be adjacent to light input sources.

FIG. 11 discloses another embodiment of the present invention in which two light guides are stacked one upon the other to form light guide 300'". In this case, a light guide 1101 is positioned on top of a light guide 1102 such that microgrooves 1316 of tight guide 1101 are adjacent to the front surface 1318 of light guide 1102. Of course, any number of light guides can be stacked upon each other or positioned adjacent to one another as long as the concept of varying groove density is implemented to achieve greater global luminance uniformity and increase light intensity output.

Figure 1:
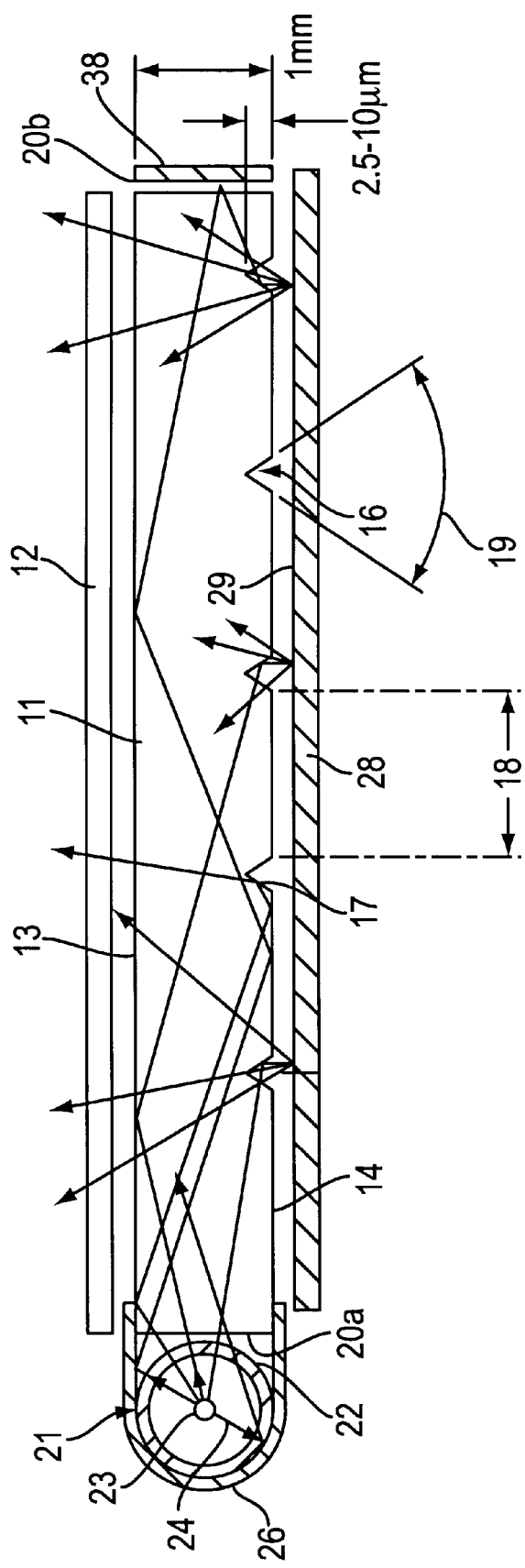
FIG. 1 is a side cross-sectional view of a conventional flat panel display.

Furthermore, in any of the embodiments discussed above the microgrooves can either be coated with a reflective material or placed adjacent to a reflective material as discussed in conjunction with FIG. 1. However, if light guides are stacked above each other as discussed in conjunction with FIG. 11. surface 1316 would not be reflectively coated or placed adjacent to a reflective material, but rather only bottom-most surface 1120 of the stack forming light guide 300'" would be reflectively coated or placed adjacent to a reflective material.

In general increased performance is realized by implementing the concepts of the present invention. These concepts include varying groove density according to increased distance from the closest light source, and fixing groove angle at twice (±2 degrees) the critical angle of the material forming the light guide. This increased performance translates to a five fold increase of the luminance at a zero degree viewing angle at the front viewing surface compared to conventional light guides.

In conclusion, increased performance is achieved by a light guide that includes a light transmissive material comprising a light input surface and a back surface, wherein the back surface includes a plurality of microgrooves positioned substantially parallel to one another and the microgrooves define a groove density that varies according to distance from said light input surface. According to one aspect of the present invention, the light guide has a critical angle, measured in degrees, at which total internal reflection occurs and the groove angle of the microgrooves is approximately twice said critical angle within approximately two degrees. The varying groove density in a light guide with an appropriate groove angle allows luminance output and uniformity to be maximized such that larger displays can be created from a single or multiple portions.

A further aspect of the present invention includes a method of creating a light guide having a plurality of triangular prismatic microgrooves with a varying groove density, comprising: calculating a critical angle for total internal reflection for a light transmissive material from which the light guide is made; calculating a groove angle based on the critical angle; calculating the groove density based on a distance from a light input edge where light is input for transmission through said light guide and output; and forming said light guide in accordance with the groove angle and groove density.

A further aspect includes a method of creating a light guide having a plurality of triangular prismatic microgrooves, comprising: identifying a transmission ratio measured between said input surface and said front surface to determine a critical angle at which total internal reflection occurs within said light guide; identifying an angle of said microgrooves based on said critical angle; determining a distance from a light input source adjacent to said light guide; calculating groove density as a function of distance from said light input surface; and cutting microgrooves in said light guide based on said calculated groove density. Specifying the relationship between groove density and distance from the light input source for a particular groove angle allows luminance and uniformity to be optimized over the majority of the light guide and particularly towards the center region. This method allows larger and brighter hat panel displays to be created which more than comply with conventional standards for uniformity and luminance.

While this invention has been described in connection with what is presently considered to be most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A light guide comprising:
   a light transmissive material comprising a light input surface and a back surface, wherein the back surface includes a plurality of microgrooves positioned substantially parallel to one another and the microgrooves define a groove density that varies according to distance from said light input surface,
   wherein said light guide has a critical angle at which total internal reflection occurs and said groove angle is approximately twice said critical angle within approximately two degrees.

2. The light guide of claim 1 wherein a light source emanates light into said light guide which is adapted to receive light at said light input surface emanated from a light source, and wherein said groove density of said light transmissive material increases based on increased distance from said light input surface.

3. The light guide of claim 1 wherein said groove angle is approximately twice said critical angle plus approximately two degrees.

4. The light guide of claim 1 wherein the light transmissive material comprises acrylic, said critical angle of acrylic is approximately 42 degrees and said groove angle is between approximately 82 and 86 degrees.

5. The light guide of claim 1 wherein the groove density is measured according to distance between the groove apex of two adjacent microgrooves, wherein groove density varies based on $y = 2E\text{-}08x^6 - 9E\text{-}06x^5 + 0.0015x^4 - 0.1267x^3 + 5.869x^2 - 148.07x + 1917.1$, where y is groove step distance, x is distance from a reference light input edge, and E is a luminance constant based on specific measurable parameters of said light guide.

6. The light guide of claim 1 wherein the light transmissive material further comprises a front surface that is substantially parallel to said back surface thereby defining the light guide as a substantially flat panel, and at least one other light transmissive material having microgrooves is positioned above said front surface such that the microgrooves of said at least one other light guide are adjacent said front surface of said light guide.

7. The light guide of claim 1 wherein said light transmissive material further comprises another light input surface opposite said light input surface, defining a pair of light input surfaces, and each of said pair of light input surfaces are substantially parallel to said substantially parallel microgrooves.

8. The light guide of claim 7 wherein said light guide has an axis of symmetry located between said pair of light input surfaces, and said microgroove density decreases in relation to increased distance from said axis of symmetry.

9. The light guide of claim 1 wherein said light transmissive material is comprised of a plurality of light transmissive portions, each having an individual varying groove density and located adjacent to each other, wherein an overall groove density, comprised of said individual groove densities, increases based on increasing distance from a closest light input surface of the light transmissive material.

10. The light guide of claim 1 wherein said back surface of said light transmissive material is coated with a reflective material.

11. The light guide of claim 1 wherein said microgrooves comprise triangular prismatic microgrooves.

12. A flat panel display screen comprising:
   a side light source;
   a light guide having a front surface, a side surface in optical communication with said side light source such that light is transmitted from said side light source through said light guide, and a back surface that includes microgrooves which reflect light input through said side surface to said front surface, said microgrooves being disposed according to a varying groove density, and said microgrooves having a groove angle that is based on approximately twice a critical angle of said light guide; and
   a housing securing the side light source and the light guide in a working relationship to one another.

13. The flat panel display screen of claim 12, further comprising a plurality of light guides located adjacent to one another within said housing.

14. The flat panel display screen of claim 13, further comprising an opposite side light source, and wherein said plurality of light guides each have varying microgroove density that decreases from a point midway between said side and opposite side light sources.

15. The flat panel display screen of claim 14, wherein said adjacent light guides are stacked upon each other.

16. The flat panel display screen of claim 14, wherein said adjacent light guides are in the same plane as one another.

17. The flat panel display screen of claim 14, wherein at least one of said light guides includes a reflective material disposed adjacent said microgrooves.

18. The flat panel display screen of claim 14, wherein at least one of said light guides includes a reflective material disposed on said microgrooves.

19. The flat panel display screen of claim 12, where said groove density increases with increasing distance from said side light source.

20. The flat panel display screen of claim 12 wherein said groove angle is approximately twice said critical angle within approximately two degrees.

21. A method of creating a light guide having a plurality of triangular prismatic microgrooves with a varying groove density, comprising:

calculating a critical angle for total internal reflection for a light transmissive material from which the light guide is made;

calculating a groove angle based on the critical angle;

calculating the groove density based on a distance from a light input edge where light is input for transmission through said light guide and output; and forming said light guide in accordance with the groove angle and groove density.

22. The method of creating a light guide of claim 21, wherein the groove angle is calculated to be approximately two times the critical angle, plus or minus approximately two degrees.

23. The method of creating a light guide of claim 21, wherein said forming the light guide comprises placing a plurality of pieces of light transmissive material adjacent to one another said pieces each having a groove density that varies according to distance from a light source.

24. The method of creating a light guide of claim 23, wherein the pieces of light transmissive material are placed adjacent to one another in the same plane.

25. The method of creating a light guide of claim 23, wherein the pieces of light transmissive material are stacked upon each other.

26. The method of creating a light guide of claim 23, wherein calculating the groove density further comprises calculating a midpoint between a pair of light input edges and varying groove density decreasingly from said midpoint towards each of said respective edges of said pair of input edges such that groove density is at a maximum at said midpoint.

27. The method of creating a light guide of claim 23 further comprising forming groove density to be minimum at input edges of said light guide.

28. A method of creating a light guide having a plurality of triangular prismatic microgrooves, comprising:

identifying a transmission ratio measured between said input surface and said front surface to determine a critical angle at which total internal reflection occurs within said light guide;

identifying an angle of said microgrooves based on said critical angle;

determining a distance from a light input source adjacent to said light guide;

calculating groove density as a function of distance from said light input surface; and cutting microgrooves in said light guide based on said calculated groove density.

29. The method of claim 28 further comprising determining an axis of symmetry between a pair of light sources and calculating groove density based on distance from at least one of said pair of light sources.

30. The method of claim 29 further comprising calculating groove density based on increasing distance from a closer light source of said pair of light sources.

* * * * *